United States Patent [19]

Kelley

[11] Patent Number: 5,351,508
[45] Date of Patent: Oct. 4, 1994

[54] LAPTOP COMPUTER SECURITY HANDLE

[75] Inventor: Donald W. Kelley, Fremont, Calif.

[73] Assignee: Qualtec Data Products, Inc., Fremont, Calif.

[21] Appl. No.: 975,619

[22] Filed: Nov. 12, 1992

[51] Int. Cl.⁵ ............................................. E05B 73/00
[52] U.S. Cl. .................................. 70/58; 16/126; 248/455; 248/551; 248/919; 361/679
[58] Field of Search ................. 70/57, 58, 62, 61, 18, 70/30, 49; 190/101, 102, 115; 16/115, 126; 248/917, 919, 923, 551, 552, 553, 454, 455; 361/679, 724, 726; 364/708.1

[56] References Cited

U.S. PATENT DOCUMENTS

| | | | |
|---|---|---|---|
| 1,211,681 | 1/1917 | Currie | 190/115 X |
| 3,298,480 | 1/1967 | Kish, Jr. | 190/115 X |
| 3,924,775 | 12/1975 | Andreaggi et al. | 16/126 X |
| 4,111,016 | 9/1978 | Dawson | 70/58 |
| 4,113,212 | 9/1978 | Coriden | 248/917 X |
| 4,123,922 | 11/1978 | Kuenstler | 70/58 |
| 4,690,286 | 9/1987 | Horne et al. | 361/390 X |
| 4,717,112 | 1/1988 | Pirkle | 248/919 X |
| 4,821,889 | 4/1989 | Cohen | 248/455 X |
| 4,858,162 | 8/1989 | Kieffer et al. | 364/708.1 X |
| 4,883,376 | 11/1989 | Iwase et al. | 248/917 X |
| 4,895,231 | 1/1990 | Yamaguchi et al. | 70/67 X |
| 4,940,204 | 7/1990 | Nelson et al. | 248/455 X |
| 4,951,241 | 8/1990 | Hosoi et al. | 364/708.1 X |
| 5,060,152 | 10/1991 | Maeser et al. | 364/708.1 X |
| 5,152,496 | 10/1992 | Kobayashi | 248/551 |
| 5,226,540 | 7/1993 | Bradbury | 364/708.1 X |
| 5,235,495 | 8/1993 | Blair et al. | 248/674 X |

FOREIGN PATENT DOCUMENTS

| | | | |
|---|---|---|---|
| 0266605 | 7/1964 | Australia | 190/115 |
| 2039733 | 12/1981 | Fed. Rep. of Germany | 361/679 |
| 2467949 | 5/1981 | France | 70/18 |
| 2510367 | 2/1983 | France | 190/101 |
| 3273323 | 12/1991 | Japan | G06F 1/16 |

Primary Examiner—Lloyd A. Gall
Attorney, Agent, or Firm—Fliesler, Dubb, Meyer & Lovejoy

[57] ABSTRACT

A laptop computer security attachment and handle assembly comprising an elongated mounting bracket having at each end and extending perpendicularly therefrom an L-shaped bracket and an elongated handle member with bushings for pivotally attaching the handle member to the L-shaped members. One of the L-shaped members is provided with an elongated hole for receiving a security cable for securing the laptop computer to a structure as by a padlock, or the like.

1 Claim, 5 Drawing Sheets

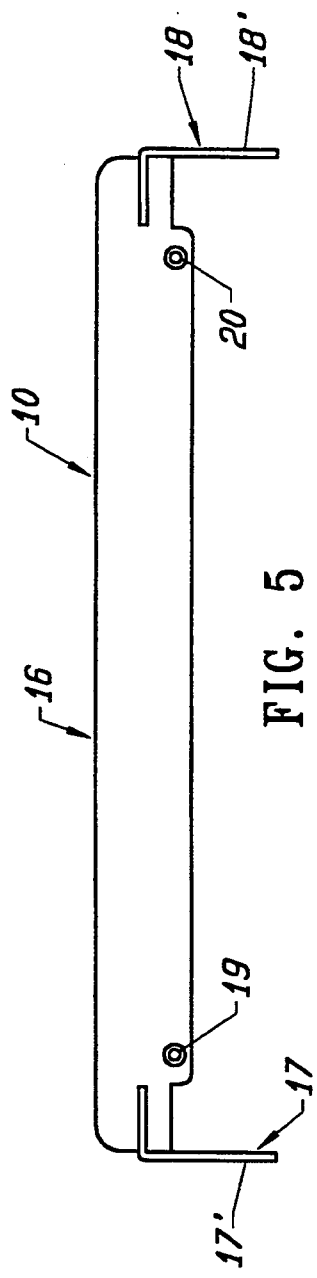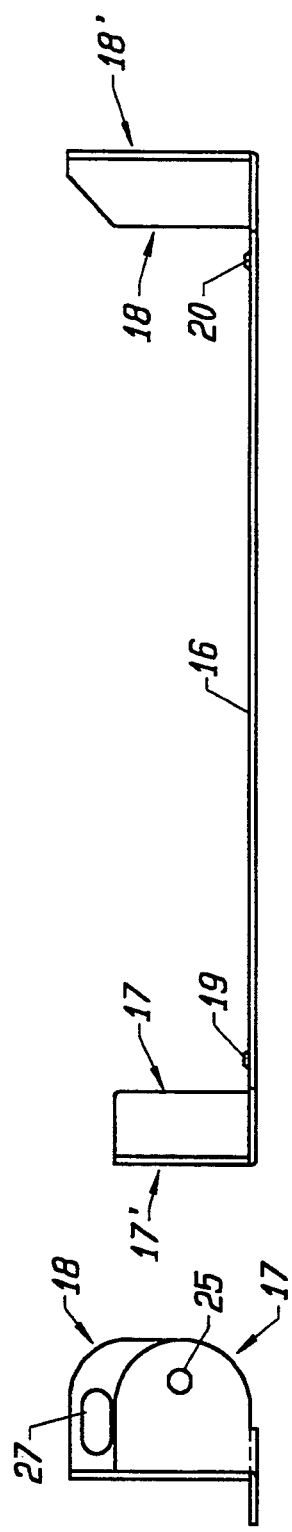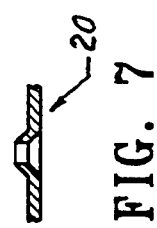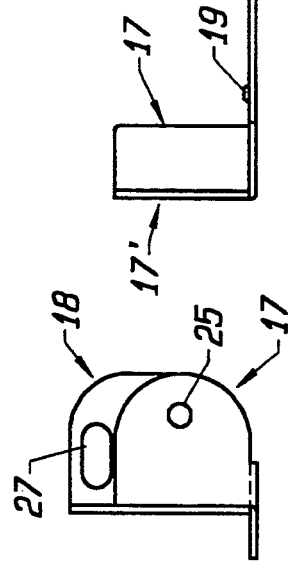

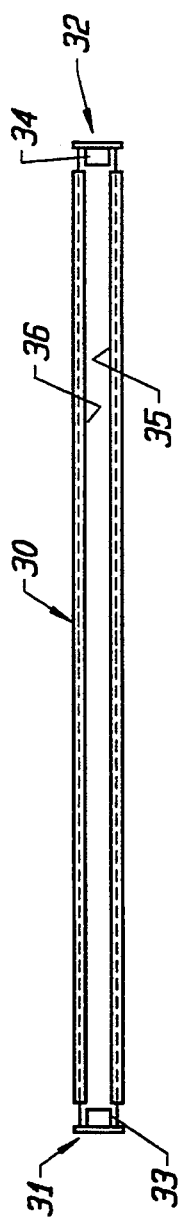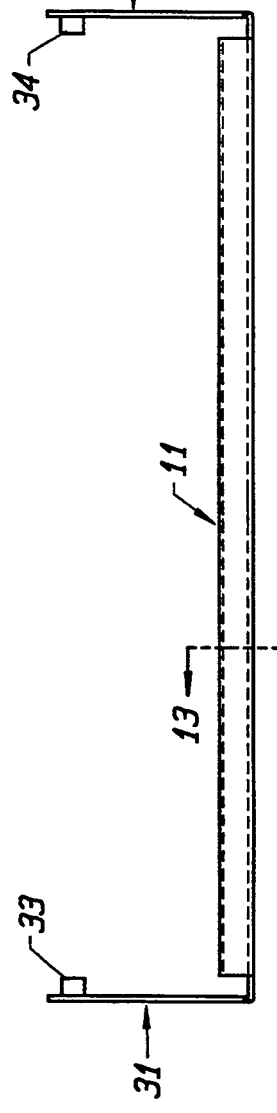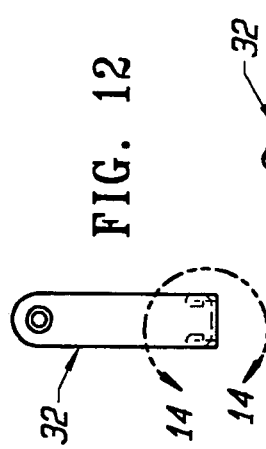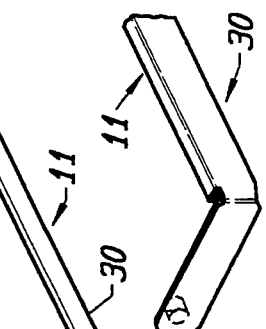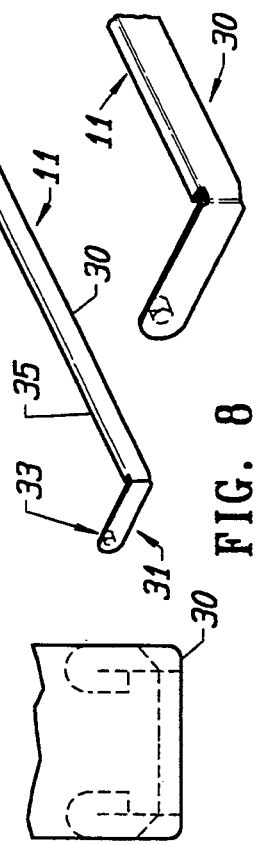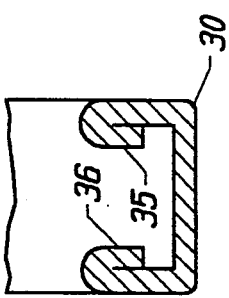

LAPTOP COMPUTER SECURITY HANDLE

BACKGROUND OF THE INVENTION

1. Field of the Invention

The present invention relates to laptop computers in general and in particular to a laptop computer security attachment and handle assembly for a laptop computer sold by Apple Computer Company under the brand name PowerBook.

2. Description of the Related Art

The laptop computer sold by Apple Computer Company under the brand name PowerBook has been sold heretofore with no means being provided for conveniently carrying the computer nor has there been provided heretofore any means for conveniently and securely attaching the computer to a structure, such as a desk, table or the like, for deterring or preventing its theft or other unauthorized removal.

SUMMARY OF THE INVENTION

In view of the foregoing, a principal object of the present invention is a security attachment and handle assembly for an Apple PowerBook laptop computer which comprises a mounting bracket with a hole strategically located therein for receiving a security cable or other means for securely tying the computer to an anchoring point, such as a permanent structure, anchor pad or the like and a handle member pivotally mounted to the bracket for conveniently carrying the computer.

In accordance with the above object there is provided in the security attachment and handle assembly a mounting bracket having a pair of upstanding members at opposite ends thereof and means for mounting the bracket to the computer in a tamper proof manner. A handle member is mounted to the upstanding members for pivotal movement with respect thereto. In use and if desired, the handle member can be pivoted to a position wherein it lies against the undersurface of the computer and serves as a prop for propping up the rear of the keyboard.

A hole is provided in one of the upstanding members for receiving a security cable and/or for use in combination with other apparatus for securely tying or otherwise attaching the computer to a permanent structure, anchor pad or the like to prevent the computer from being stolen or otherwise subject to an unauthorized removal.

BRIEF DESCRIPTION OF THE DRAWINGS

The above and other objects, features and advantages of the present invention will become apparent from the following detailed description of the accompanying drawings, in which:

FIG. 4 is a side elevation view of the bracket of FIG. 3;

FIG. 5 is a top plan view of FIG. 4;

FIG. 6 is an end view of FIG. 4;

FIG. 7 is an enlarged cross-sectional view of a bracket mounting hole for mounting the bracket to a laptop computer according to the present invention;

FIG. 8 is a perspective view of a handle member according to the present invention;

FIG. 9 is an enlarged view of one end of the handle member of FIG. 8;

FIG. 10 is a side elevation view of the handle member of FIG. 8;

FIG. 11 is a plan view of FIG. 10;

FIG. 12 is an end view of FIG. 10;

FIG. 13 is a cross-sectional view taken in the direction of lines 13—13 in FIG. 10;

FIG. 14 is an enlarged view of an end portion within the lines 14—14 of FIG. 12;

DESCRIPTION OF THE PREFERRED EMBODIMENTS

Figure 1:
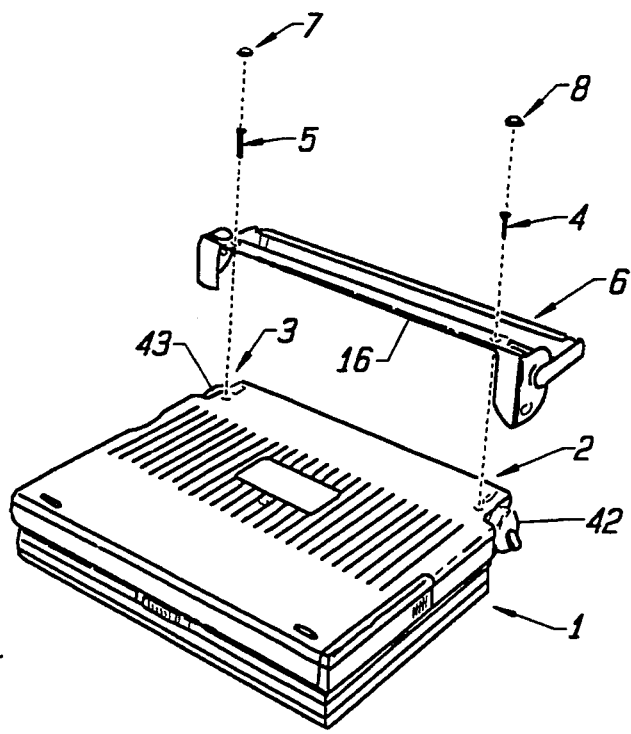
FIG. 1 is an exploded perspective view of a laptop computer and laptop computer security attachment and handle assembly according to the present invention.
Figure 20:
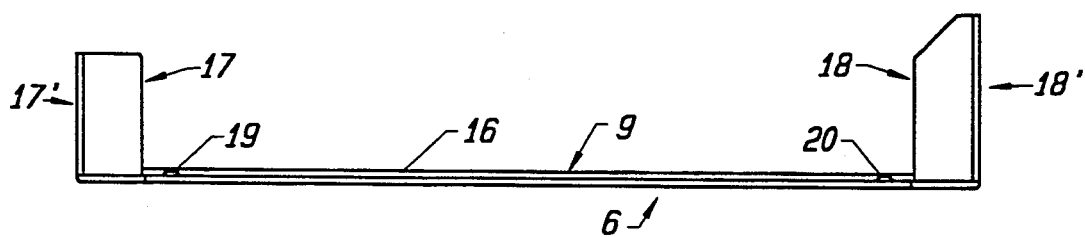
FIG. 20 is a side elevation view of the bracket of FIG. 3 showing the use of an adhesive for mounting the bracket to a laptop computer.

Referring to FIG. 1, there is shown a laptop computer designated generally as 1 which is sold by Apple Computer Company, Cupertino, Calif., under the brand name PowerBook. The computer 1 is provided with a pair of female threaded screw mounting holes 2 and 3 in which is threaded a pair of screws 4 and 5 for mounting a security attachment and handle assembly 6 to the computer 1 according to the present invention. The screws 4 and 5 are of a type commonly known as tamper-proof screws which cannot be readily removed with a conventional screwdriver, Allen wrench or the like, but require either physical destruction of the screw or a special tool for their removal. Alternatively, the assembly 6 may be mounted to the computer 1 by means of a suitable adhesive 9, as shown in FIG. 20.

After the assembly 6 is mounted to the computer 1 by means of the screws 4 and 5, cap members 7 and 8 are placed over the heads of the screws to hide the screws. Cap members 7 and 8 may comprise rubber or other elastic foot members for supporting the computer 1 on a horizontal surface, desktop, or the like, in such a manner so as not to mar the surface.

Figure 2:
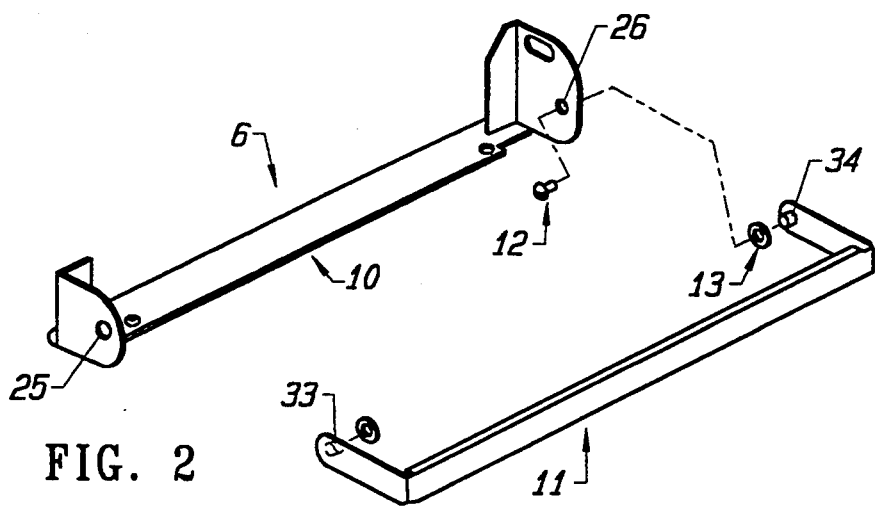
FIG. 2 is an enlarged exploded perspective view of the security attachment and handle assembly of FIG. 1.
Figure 3:
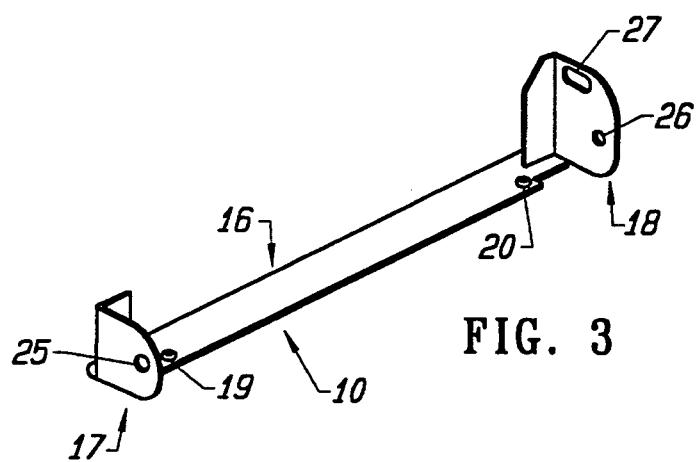
FIG. 3 is a perspective view of a security attachment and handle assembly mounting bracket according to the present invention.

Referring to FIG. 2, there is provided in the assembly 6 a bracket 10 and a handle member 11 which is pivotally attached to the bracket 10 by means of a pair of screws 12 and washers 13. Screws 12 may comprise #8-32×¼ inch pan head Phillips head screws and washers 13 may comprise nylon, an internal diameter of 0.285 inches, an outside diameter of 0.50 inches and a thickness of 0.06 inches.

Referring to FIGS. 3–7, there is provided in the bracket 10 an elongated generally rectangular flat intermediate plate member 16. Extending perpendicular from each end of the member 16 there is provided a pair of L-shaped bracket end members 17 and 18. The walls 17' and 18' of the end members 17 and 18 which extend perpendicular to the longitudinal axis of the member 16 extend beyond the adjacent edge of the member 16 to enclose rotatable computer propping members 42, 43 as seen in FIG. 1, which are made and sold with the computer, and to provide an attachment member for the handle member 11.

Located in the member 16 interior of the members 17 and 18 there is provided a pair of countersunk bracket-mounting screw receiving holes 19 and 20, as shown in detail in FIG. 7, for mounting the bracket 10 to the computer 1 by means of the screws 4 and 5 as shown in FIG. 1. In the members 17 and 18 there is provided holes 25 and 26, respectively, for mounting the handle 11 to the bracket 10. In the member 18 there is further provided an elongated oval shaped hole 27 which is provided for receiving a security cable or the like for securing the computer to a structure, as will be further described below.

Referring to FIGS. 8–14, there is provided in the handle member 11 an elongated generally rectangular main body member 30 and a pair of leg members 31 and 32 extending perpendicularly from the ends thereof. At the ends of each of the leg members 31 and 32 there is provided a female threaded self-clinching standoff 33 and 34, respectively. Standoffs 33 and 34 are provided to pass into the holes 25 and 26 in the end members 17, 18 to provide pivotal support in the nature of a bushing for the handle member 11. The screws 12 are threaded into the standoffs 33 and 34 as shown in FIG. 2. To provide strength and rigidity for the handle 11 and a comfortable and smooth surface for a person grasping the handle, opposite edges 35, 36 of the intermediate member 30 are bent inwardly and provided with a smooth radius, as shown more clearly in FIGS. 13 and 14.

Figure 15:
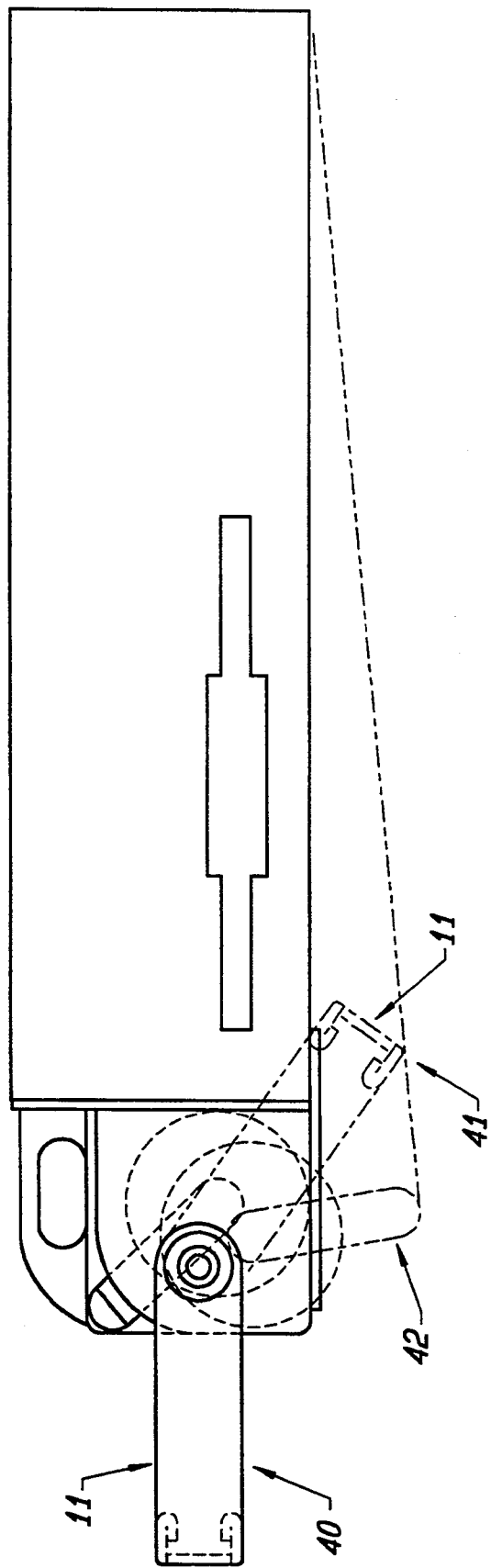
FIG. 15 is a side view of the combination laptop computer and security attachment and handle assembly according to the present invention showing the handle member in its carrying and computer propping position.

Referring to FIG. 15, in use the handle member 11 can be pivoted from a first or carrying position as shown at 40 wherein it is used for carrying the computer 1 in a manner similar to a handle used for carrying a briefcase and a second or propping position 41 wherein the member 30 rests against the bottom of the computer 1 for propping up the rear of the computer 1 to facilitate use of the keyboard thereof. In this regard it may be noted that the handle member 11 takes the place and serves the function of the pair of rotatable prop members 42 and 43 which are provided by the manufacturer of the computer for propping the computer as described above.

Figure 16:
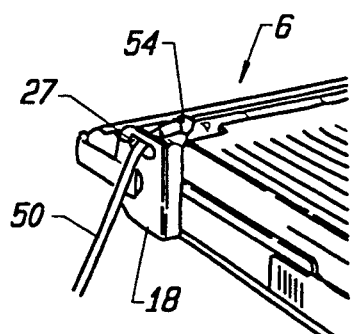
FIGS. 16 and 17 are perspective views of opposite ends of a cable assembly used for securing the laptop computer to a structure.
Figure 17:
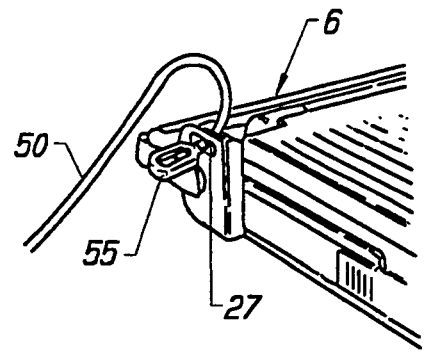

Referring to FIGS. 16 and 17, there is provided a cable 50 having a ball fitting 54 and a rectangularly shaped aperture fitting 55 which in use is passed through a hole 27 in the end member 18 of the assembly 6. In practice, the hole 27 is small enough and the ball 54 is large enough that the ball 54 cannot be pulled through the hole.

Figure 18:
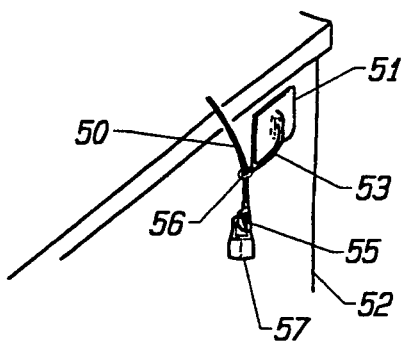
FIGS. 18 and 19 are perspective views of alternative methods of using the cable assembly of FIGS. 16 and 17 for securing a laptop computer to a structure according to the present invention.

Referring to FIG. 18, there is provided for use with the security cable 50 an anchor pad 51 affixed to the side of a desk 52 having a cable stub or member 53 with a rectangularly shaped apertured fitting 56 extending therefrom.

In use, the apertured fitting of the cable 50 is passed through the hole 27 in the end member 18 of the security attachment and handle assembly 6 until the ball 54 is captured thereby, as shown in FIG. 16. The apertured fitting 55 is then passed through the aperture in the apertured fitting 56 and, thereafter, a padlock, or the like, 57 is locked to the fitting 55 to prevent its withdrawal through the aperture in the fitting 56 thus securing the laptop computer to the structure 52.

Figure 19:
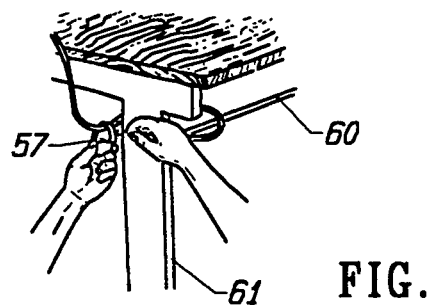

Referring to FIG. 19, there is shown an alternative method for securing the laptop computer to a structure 60. In the method shown in FIG. 19, the apertured fitting 55 is passed through the hole 27 in the security attachment and handle assembly 6 as described above and then around a leg 61, or the like, extending from the structure 60 and locked to itself by the padlock 57, or the like.

While specific dimensions of the security attachment and handle assembly 6 according to the present invention are required for the current model of the Power-Book brand laptop computer made by Apple Computer Company, changes by Apple Computer Company in the dimensions of their PowerBook brand laptop computer could require corresponding changes to the security attachment and handle assembly 6 of the present invention. Moreover, it is contemplated that other laptop or portable computers may benefit from a security attachment and handle assembly as disclosed and claimed in the present application and that, therefore, the security attachment and handle assembly of the present invention may be adapted to be attached thereto in a tamper-proof manner without departing from the spirit and scope of the invention.

Accordingly, it is intended that the embodiment described be considered only as illustrative of the present invention and that the scope thereof should not be limited thereto but be determined by reference to the claims hereinafter provided.

What is claimed is:

1. A security attachment and handle assembly for a laptop computer comprising:

a bracket having an elongated, generally flat, rectangular intermediate member and an L-shaped end member extending perpendicularly from each end of the intermediate member, each of the L-shaped end members having first and second orthogonal walls, wherein at least one of the orthogonal walls extends perpendicular to a longitudinal axis and beyond an adjacent side edge of the intermediate member;

means for mounting the bracket to the computer such that the walls of each of the L-shaped end members extend parallel to surfaces on opposite sides of the computer, respectively;

a U-shaped handle member having a leg member extending perpendicularly from each end of an elongated center member; and means for attaching one of the leg members at each end of the elongated center member to that wall of a corresponding one of each of the L-shaped end members which extends perpendicular to the longitudinal axis and beyond the adjacent side edge of the intermediate member in such a manner that the handle member can be pivoted between a first and a second position, wherein the wall of at least one of the L-shaped members which extends perpendicular to the longitudinal axis and beyond the adjacent side edge of the intermediate member comprises a hole for receiving a security cable which can be used to tie the computer to a structure in a secure manner.

* * * * *